Patented Nov. 2, 1948

2,452,870

UNITED STATES PATENT OFFICE 2,452,870

REACTION PRODUCT OF ROSIN AND CO-POLYMER OF VINYL ACETATE AND AN ALPHA-UNSATURATED CARBOXYLIC ACID ESTER AND PROCESS OF MAKING SAME

John B. Rust, West Orange, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application July 21, 1944, Serial No. 546,050

8 Claims. (Cl. 260—27)

This invention relates to rosin reaction products and particularly to esters obtained by reacting rosin with vinyl acetate copolymers.

It is an object of this invention to prepare resins readily soluble in drying oil and which have a low acid number. A further object is to prepare resins which when dissolved in drying oils yield varnishes which are rapid drying. Another object is to produce resins which are compatible with cellulose esters and yield lacquers of fast solvent release. Still other objects will be apparent from the description which follows.

It is known that when polyvinyl acetate is heated with rosin, acetic acid is given off and a clear resin (presumably a polyvinyl alcohol ester of rosin) is obtained which is soluble in benzene and linseed oil. Examination of such products has shown that they have high acid numbers (from 70 to 100) and, when heated further in an effort to lower the acid number, they became infusible (at varnish-making temperatures) and oil-insoluble. Even when the polymer is used in excess in an effort to neutralize all the rosin the product still has a high acid number. For example, vinyl acetate was polymerized by heating on a water bath for 1 hour with 1% of benzoyl peroxide and the volatile constituents then removed to yield a hard tough polymer. 25 parts of the polymer and 100 parts of rosin (approximately theoretical proportions based on an acid number of 160 for rosin) were heated to 200° C. during 1 hour, then from 200° to 250° C. in ½ hour and held at 250°–260° C. for 1½ hours, to form a clear resin which was soluble in benzene and in linseed. The acid number, however, was 70.5. A mixture of equal parts of the resin and linseed oil was heated during 1 hour to 310° C. The resin dissolved but the mixture was near the gel point. The acid number of the varnish base was 26, which indicates that even when carried to an ultimate stage the acid number of the resin (52) is still relatively high.

In an attempt to get a low acid number resin, an excess of polymer of lower molecular weight was used.

(A) A polyvinyl acetate solution containing 33.6% polymer was prepared by heating 150 parts of vinyl acetate, 200 parts of acetone and 1.5 parts of benzoyl peroxide under reflux on a water bath for 4 hours. 150 parts of rosin and 128 parts of the solution (containing 43 parts of polyvinyl acetate; 37 parts is theoretical) were heated to remove solvent and held at 220°–230° C. for 4½ hours. The product had an acid number of 100.3 and was not soluble in drying oils.

(B) Solvent was removed from a mixture of 71 parts of rosin and 140 parts of the above solution containing 47 parts of polymer (17.4 parts is approximately theoretical). The mixture was heated to 230° C. during 2½ hours. The product was infusible but soluble in acetone. Acid number 80.1.

In contrast with the properties, as noted above, of rosin-polyvinyl acetate reaction products, it has now been found that rosin reacts with copolymers of vinyl acetate and certain other polymerizable compounds containing an ethylenic linkage to give oil-soluble resins of low acid number. In application Serial No. 545,190, filed July 15, 1944, there is described the reaction product of rosin with copolymers of vinyl acetate and esters of allyl and related alcohols. Oil-soluble resins of low acid number are also obtained by reacting rosin with copolymers of vinyl acetate and certain polymerizable alpha-unsaturated carboxylic acid esters and the present invention is based on this discovery.

Alpha-unsaturated carboxylic acid esters may be represented by the formula

where $R_1$ and $R_2$ may be hydrogen, halogen or an alkyl group, $R_3$ is similar to $R_1$ and $R_2$ or may be a carbalkoxy group, and $R_4$ is an alkyl group.

Not all esters corresponding to this formula are utilizable herein. For example, such esters as methyl and ethyl acrylate, methyl crotonate and methyl methacrylate yield resins which are oil-insoluble. That is, reaction products of rosin with copolymers of vinyl acetate and these latter esters, wherein the vinyl acetate was varied from 1 to 5 parts per 1 part of copolymerizing ester, were hazy resins having high acid numbers (60 to 100) and were soluble in acetone but insoluble in drying oils. For example, a product obtained by heating, at 250°–260° C. for ½ hour, a mixture of 100 parts of rosin with 43 parts of a copolymer produced by polymerizing 2 parts of vinyl acetate with 1 part of methyl methacrylate was a hard, cloudy mass, soluble in acetone but not in linseed oil and having an acid number of 97. Likewise, a product produced from rosin heated with a copolymer of 2 parts vinyl acetate and 1 part ethyl acrylate was a cloudy, soft resin, insoluble in drying oils and of acid number 67.

On the other hand, polymerizable alpha-unsaturated carboxylic acid esters containing more than 5 carbon atoms, when copolymerized with vinyl acetate in proportions varying over such a wide range as from 1 to 5 parts of vinyl acetate to 1 part of copolymerizing ester, yield the clear, oil-soluble, low acid number resins of this invention. Such esters include propyl, butyl and amyl acrylates, ethyl, propyl, butyl and amyl methacrylates, ethyl, propyl, butyl and amyl crotonates and the methyl, ethyl, etc., esters of dibasic acids such as maleic and fumaric. These are all alkyl esters of acids of the acrylic type. As a rule, the carbalkoxy group contains a radical no higher than hexyl unless soft, low-melting resins are desired.

The copolymers herein described consist of chain molecules containing vinyl acetate links and acrylic type ester links. In reacting with rosin, acetic acid is split from the vinyl acetate link and rosin attaches to the chain as a side group by ester union. The acrylic links presumably remain unchanged but influence the degree of reaction of the acetate group with rosin and solubility of the product. The lower esters of acrylic type acids (e. g., methyl and ethyl acrylate, and methyl methacrylate), containing 5 carbon atoms or less, polymerize readily to hard glasses of high molecular weight. The higher esters (those containing more than 5 carbon atoms) yield softer polymers of lower molecular weight. It is probable that the same relation occurs in copolymerization and that the lower molecular weight and softer characteristics of the vinyl acetate-higher acrylic ester copolymer influence its reaction with rosin to yield oil-soluble resins of low acid number. Whatever the theoretical explanation, it is obvious that there is a pronounced difference in properties between those resins produced from acrylic type esters containing more than 5 carbon atoms and those containing 5 or less.

The copolymers are made by polymerizing a mixture of from 1 to 5 parts of vinyl acetate with 1 part of the alpha-unsaturated carboxylic acid ester containing more than 5 carbon atoms in known manner, as by heating on a water bath in the presence of about 1% of benzoyl peroxide. The copolymer may be used in crude form, or with volatile constituents removed. Also, it may be dissolved in an inert solvent and the rosin added to this solution, the solvent then being removed.

The resins are made by heating a mixture of rosin and the copolymer at a temperature higher than the boiling point of acetic acid and preferably between about 200° and 300° C., although lower temperatures may be used if heating is under vacuum. Preferably the rosin is taken in amount equivalent to or slightly less than equivalent to the acetic acid to be replaced and by collecting and measuring the acetic acid given off the progress of the reaction is readily determined. An inert atmosphere such as carbon dioxide can be used altthough not necessary, since the resins are color-stable during heating.

The acid number of the resins of this invention usually varies between about 5 and 20, although, depending upon characteristics of some of the reactants, the acid number may be as high as 40. Therefore, by the term "low acid number" is meant an acid number below about 40.

The resins may be modified in various ways. For example, they may be fluxed with another synthetic resin such as a phenolaldehyde condensation product or an alkyd resin, or with a natural resin. An excess of rosin may be used and the excess later neutralized by formation of a salt or ester as by reaction with lime or glycerol. Drying oil modifications suitable as varnish bases may be made by replacing part of the rosin by drying oil acids or by heating a mixture of rosin, the copolymer and a drying oil; that is, by forming the rosin ester in the presence of a drying oil. A type of alkyd resin is obtained by replacing part of the rosin by a polycarboxylic acid such as phthalic, maleic or sebacic, or by a mixture of such acids and drying oil acids, heating being carried out at a temperature below the boiling point of such acids. The rosin may also be first modified by reaction with maleic anhydride or other compound which forms an adduct with rosin.

The following are illustrative examples of the invention. Many others might be given but the following are representative. All parts are by weight.

*Example 1.*—A copolymer was obtained by heating under reflux on a water bath a mixture of 3 parts freshly distilled vinyl acetate and 1 part of butyl crotonate, together with 1% of benzoyl peroxide. After 4 hours the product was a tough rubbery polymer. It was dissolved in acetone to form a solution containing 53% solids.

Three hundred parts rosin and 190 parts of the acetone solution of the polymer were heated to distil off the solvent. Then the temperature was taken to 250° C. during 1 hour and held at 250°-270° C. for 3 hours. Acetic acid was given off and a light-colored resin was obtained having an acid number of 17 and softening point (ball and ring) of 105° C.

A lacquer containing 1 part of nitrocellulose and 3 parts of the above resin, dissolved in a mixture of butyl acetate and toluene, dried to a clear hard film.

A 25-gallon varnish was prepared by heating 25 parts of this resin and 50 parts of bodied linseed oil to 300° C. and holding at this temperature for 20 minutes. The resulting varnish base was cooled to 225° C. and thinned with 75 parts of mineral spirits containing 0.5% lead and 0.05% cobalt (as naphthenates), based on the oil content of the varnish. The resulting varnish was clear and light-colored. It air-dried to a dust-free film in 1 hour and a tack-free film in 3¾ hours.

*Example 2.*—One hundred parts of WW rosin and 33.3 parts of a copolymer (prepared by heating 60 parts of vinyl acetate, 21 parts of ethyl crotonate, and 0.8 part of benzoyl peroxide) were heated together as follows:

20° C.–200 C. in 1 hour
200° C.–250° C. for 1 hour, and
250° C.–275° C. for 4 hours A hard, brittle resin was obtained which possessed an acid number of 9 and a softening point of 96° C.

A varnish was prepared by heating 30 parts of this resin and 50 parts of Conjulin (a commercial linseed oil treated to produce a certain amount of conjugated unsaturation) to 290° C. in ½ hour and holding at this temperature (290–300° C.) for 27 minutes. The resulting varnish base was cooled to 225° C. and thinned with 90 parts of Varsol containing 0.5% lead and 0.05% cobalt (as naphthenates) based on the oil content of the varnish. The resulting varnish was clear and light colored. It air-dried to a dust-free film in 1¼ hours, and was tack-free in 4¼ hours.

*Example 3*—Thirty parts of butyl methacrylate, 60 parts of vinyl acetate, and 0.9 part of benzoyl peroxide were heated under reflux on a water bath at 80°–100° C. for approximately 4 hours. A thick, viscous syrup was secured which was further heated for 1 hour in an oven at 140°–150° C. to eliminate all non-volatile matter. A hard, tough copolymer was obtained.

One hundred fifty parts of WW rosin and 50 parts of the above copolymer were heated together as follows:

20° C.–200° C. in 1 hour
200° C.–250° C. for 1 hour
250° C.–270° C. for 7½ hours A light-colored, hard, brittle resin was obtained which possessed an acid number of 6 and a softening point of 100° C.

Twenty-five parts of the resin and 50 parts of alkali-refined linseed oil were heated together to 300° C. over a period of 1 hour and then held at this temperature for 18 minutes. The resulting varnish base was cooled to 225° C. and thinned with 75 parts of Varsol containing 0.5% lead and 0.05% cobalt (as naphthenates) based upon the oil content of the varnish. The resulting varnish dried to a dust-free film in 1 hour, and was tack-free in 3 hours.

*Example 4.*—One hundred parts of WW rosin and 30 parts of a vinyl acetate-ethyl methacrylate copolymer (prepared from 3 parts of vinyl acetate and 1 part of ethyl methacrylate) were heated as follows:

20° C.–200° C. in 1 hour
200° C.–240° C. for 2 hours, and
240° C.–260° C. for 4 hours A hard, tough resin was obtained which possessed an acid number of 18 and a softening point of 91° C. This resin was soluble in drying oils.

*Example 5.*—One hundred fifty parts of WW rosin and 45 parts of a vinyl acetate-diethyl maleate copolymer (prepared from 3 parts of vinyl acetate and 1 part of diethyl maleate) were heated together as follows:

20° C.–250° C. in 1 hour
250° C.–270° C. for 4 hours

A light-colored, clear resin was obtained which possessed an acid number of 9 and a softening point of 106° C. This resin was oil-soluble and produced quick-drying varnishes.

We claim:

1. An oil-soluble resin of low acid number comprising the heat-reaction product of rosin and a copolymer of from 1 to 5 parts of vinyl acetate with 1 part of an alpha-unsaturated carboxylic acid ester containing more than 5 carbon atoms, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

2. An oil-soluble resin of low acid number comprising the heat-reaction product of rosin and a copolymer of from 1 to 5 parts of vinyl acetate with 1 part of butyl methacrylate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

3. An oil-soluble resin of low acid number comprising the heat-reaction product of rosin and a copolymer of from 1 to 5 parts of vinyl acetate with 1 part of butyl crotonate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

4. An oil-soluble resin of low acid number comprising the heat-reaction product of rosin and a copolymer of from 1 to 5 parts of vinyl acetate with 1 part of diethyl maleate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

5. An oil-soluble resin of low acid number comprising the heat-reaction product of rosin and a copolymer of 2 parts of vinyl acetate with 1 part of butyl methacrylate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

6. An oil-soluble resin of low acid number comprising the heat-reaction product of rosin and a copolymer of 3 parts of vinyl acetate with 1 part of butyl crotonate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

7. An oil-soluble resin of low acid number comprising the heat-reaction product of rosin and a copolymer of 3 parts of vinyl acetate with 1 part of diethyl maleate, the rosin being in amount of from 100 to 300 parts to 30 to 100.7 parts by weight of copolymer sufficient to furnish rosin acids substantially equivalent to the acetic acid radicals of the copolymer, the acid number of said heat-reaction product being below 40.

8. The process of making an oil-soluble resin of low acid number which comprises heating rosin with a copolymer of from 1 to 5 parts of vinyl acetate and 1 part of an alpha-unsaturated carboxylic acid ester containing more than 5 carbon atoms, the rosin being sufficient in amount of from 100 to 300 parts to 30 to 100.7 parts by weight of copolymer to furnish rosin acids substantially equivalent to the acetic acid radicals of the copolymer, the temperature of heating being higher than the boiling point of acetic acid but less than about 300° C., and the time of heating being sufficient for rosin to replace acetic acid radicals in the copolymer, whereby a rosin ester of acid number below 40 is formed.

JOHN B. RUST.
WILLIAM B. CANFIELD.

REFERENCES CITED

The following references are of record in the file of this patent:

UNITED STATES PATENTS

| Number | Name | Date |
| --- | --- | --- |
| 2,211,689 | Dittmar | Aug. 13, 1940 |